US007958506B2

(12) United States Patent
Mann

(10) Patent No.: US 7,958,506 B2
(45) Date of Patent: Jun. 7, 2011

(54) TIME SLICED INTERRUPT PROCESSING ON VIRTUALIZED PLATFORM

(75) Inventor: Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1385 days.

(21) Appl. No.: 11/474,146

(22) Filed: Jun. 22, 2006

(65) Prior Publication Data

US 2007/0300218 A1 Dec. 27, 2007

(51) Int. Cl.
*G06F 9/455* (2006.01)
*G06F 9/48* (2006.01)
*G06F 1/00* (2006.01)
*G06F 9/46* (2006.01)

(52) U.S. Cl. ............ 718/1; 712/244; 713/323; 718/107

(58) Field of Classification Search ............. 718/1, 107; 712/244; 713/323

See application file for complete search history.

(56) References Cited

U.S. PATENT DOCUMENTS 5,361,375 A * 11/1994 Ogi .................................. 718/1
6,408,393 B1 * 6/2002 Imada et al. .................. 713/300
2004/0163008 A1 * 8/2004 Kim .................................. 714/4
2004/0230712 A1 * 11/2004 Belmar et al. .................. 710/15
2007/0240163 A1 * 10/2007 Conrad et al. ................ 718/107

* cited by examiner

*Primary Examiner* — Meng-Ai An
*Assistant Examiner* — Brian Chew
(74) *Attorney, Agent, or Firm* — Blakely, Sokoloff, Taylor & Zafman LLP

(57) ABSTRACT

A technique to process interrupts on a virtualized platform. A plurality of virtual machines (VMs) runs on the virtualized platform having at least a processor. The VMs include a power VM. A VM scheduler schedules the VMs for execution on the virtualized platform according a scheduling policy. A virtualized interrupt mask controller controls masking an interrupt from an interrupting source according to the scheduling policy.

18 Claims, 9 Drawing Sheets

TIME SLICED INTERRUPT PROCESSING ON VIRTUALIZED PLATFORM

BACKGROUND

1. Field of the Invention

Embodiments of the invention relate to the field of virtualization technology, and more specifically, to interrupt processing on a virtualized platform.

2. Description of Related Art

Virtualization technologies have been hosted on server-class computing platforms. These computing platforms are typically highly available, and run at the highest levels of performance, e.g., with lowest latency, highest bandwidth, highest frequency. The high-performance demanded by virtualization usually translates to increased consumption of power, and increased generation of heat. This is in direct conflict with the goals of desktop and mobile platforms which attempt to reduce the cooling requirements or maximize battery life by minimizing required power usage. The primary method used to reduce power is to dynamically lower the central processing unit (CPU) or processor frequency, aggressively detect idle states of the platform and halt CPU execution, and power down unneeded or little used devices. Each of these power state transitions is typically associated with the absence or presence of device interrupts or external events.

With virtualized platforms, not all virtual machines (VMs) may own servicing the interrupts from all of the devices. For every hardware interrupt asserted to the CPU, the interrupt may cause an immediate exit from whatever VM is currently executing on the CPU, including power saving HALT states, regardless of whether the current VM would handle the actual hardware interrupt cause or not. This behavior makes it difficult to develop individual VM partitions separately, and estimate the processing and power requirements associated with combining individual VMs onto the same platform. In addition, frequently generated interrupts may cause significant overhead in VM exits and resumes, leading to degraded performance.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
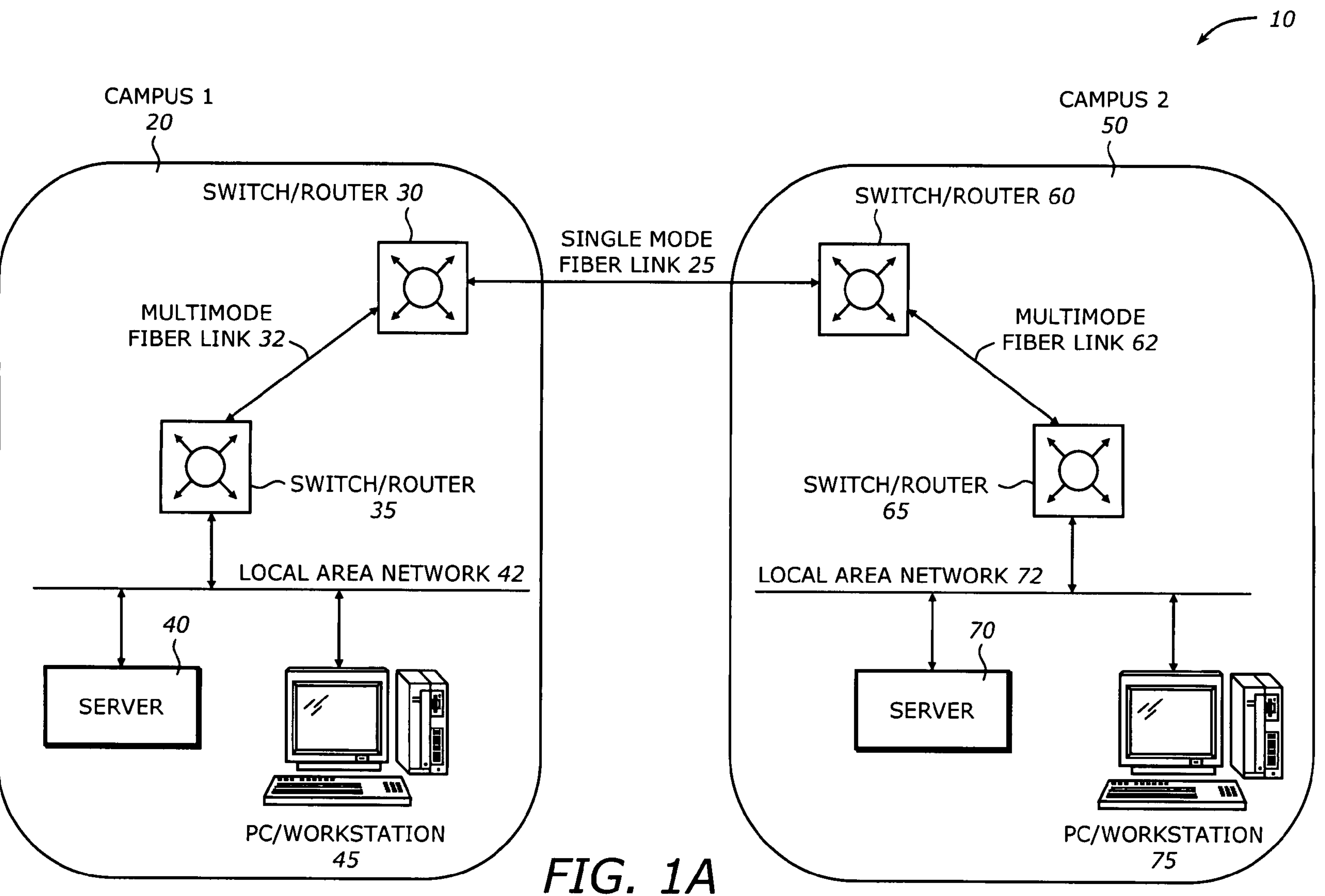
FIG. 1A is a diagram illustrating a network system in which one embodiment of the invention can be practiced.

An embodiment of the present invention is a technique to process interrupts on a virtualized platform. A plurality of virtual machines (VMs) runs on the virtualized platform having at least a processor. The VMs include a power VM. A VM scheduler schedules the VMs for execution on the virtualized platform according a scheduling policy. A virtualized interrupt controller controls masking an interrupt from an interrupting source according to the scheduling policy.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to process interrupts to reduce power consumption and/or improve performance of VMs on a virtualized platform having multiple VMs. A scheduler schedules the VMs for execution on the virtualized platform according to a scheduling policy. A virtualized interrupt controller controls the masking/enabling or unmasking/disabling of the interrupts. Interrupts generated by interrupting devices or sources are masked/enabled or unmasked/disabled according to this scheduling policy. When an interrupt is generated by an interrupting device or source that does not belong to, or is not owned by, the currently scheduled VM, it is masked or disabled. The notification of the interrupt is deferred. The deferred interrupt is unmasked or enabled for service when the VM owning the device or source resumes or is scheduled for execution. When an interrupt is generated by an interrupting device or source that belongs to, or is owned by, the currently scheduled VM, it is unmasked or enabled, and may be serviced immediately.

The scheduling policy may be a round robin policy where each VM is allocated a predetermined time slice for using the physical CPU or processor. Typically, for N VMs, the duty cycle for interrupt unmasking/enabling is approximately 1/N percent. By deferring servicing an interrupt which does not belong to the currently scheduled VM, the physical CPU may be left in the idle or power saving state when the currently scheduled VM is idle or in a power saving state. This results in a reduction of power consumption. In addition, the overhead in VM exits and VM resumes is significantly reduced or minimized, leading to high performance. Most device interrupts are not time critical. Examples of these device interrupts may include keyboard, mouse, and periodic device activity testing. Therefore, deferring servicing a device interrupt within a short time period does not have any noticeable effort on interrupt performance. The frequency for deferring servicing an interrupt, or scheduling a VM, is typically in the order of a few hundred Hertz to a few thousand Hertz, or any suitable frequency. This corresponds to an interrupt service latency of approximately a few hundred microseconds to a few hundred milliseconds. This latency is sufficiently fast for most device interrupts.

Among the VMs, there may be a power VM that may be a designated VM, or a functionality as part of the VM monitor (VMM), that controls system activity using the VM scheduling policy to implement a method to allocate power saving periods. The power VM may also be implemented as a VM image customized by an independent software vendor (ISV) or an operating system vendor (OSV). This VM image may be loaded on a standard virtualization product which provides power saving features. The power VM may also be implemented as a module which in built into a virtualization product. Typically, the power VM is responsible for, or is assigned to, interrupts that are generated at a system or platform level such as platform Advanced Configuration and Power Interface (ACPI) interrupts, low battery alarm, Alternating Current (AC) to battery transition, dock/undocking, etc. In addition, the power VM may also be responsible for any specific or proprietary events. The power VM is typically idle and does not have device pending interrupts for injection. This enables OSVs and/or ISVs to implement a controllable and predictable power down on the CPU which is not pre-empted by arbitrary device interrupts.

FIG. 1A is a diagram illustrating a system 100 in which one embodiment of the invention can be practiced. The system 100 represents a Local Area Network (LAN) applications using 10 Gigabit Ethernet. The system 100 includes two campuses 20 and 50 and link 25.

Each of the campuses 20 and 50 represents an enterprise using network interconnections to link personal computers (PCs), workstations, and servers. They may have aggregation of multiple 1000BASE-X or 1000BASE-T segments into 10 Gigabit Ethernet downlinks. The link 25 may be a single mode fiber link that connects the two campuses 20 and 50 over a long distance (e.g., 40 km).

Campuses 20 and 50 may be similar in their infrastructure. The network in each campus may encompass buildings, data centers, or computer rooms. The campus 20 may include switches/routers, such as switch/router 30 and switch/router 35, and a LAN 42. The campus 50 may include switches/routers, such as switch/router 60 and switch/router 65, and a LAN 72. Switch/routers 30 and 60 are typically located at the edge of the corresponding campuses. They are connected together via the link 25. Switches/routers 30 and 35 are connected via a multimode fiber link 32 over shorter distances (e.g., 30-80 meters) at speed of up to 10 Gigabits per second (Gbps). The switch/router 35 is connected to the LAN 42. Similarly, switches/routers 60 and 65 are connected via a multimode fiber link 62 over shorter distances (e.g., 30-80 meters) at speed of up to 10 Gigabits per second (Gbps). The switch/router 65 is connected to the LAN 72.

The LAN 42 provides connectivity to servers, PCs, or workstations, such as a server 40 and a personal computer (PC)/workstation 45. Similarly, the LAN 72 provides network connectivity to servers, PCs, or workstations, such as a server 70 and a PC/workstation 75. The server 40 or 70 provides specific operations to support the computing environment. They may be a print server connected to a variety of printers, a storage server connected to mass storage devices such as tape drive, redundant arrays of inexpensive disks (RAIDs), a media server to provide multimedia services such as video, audio, or graphics, or any server with specific functions. Each server typically includes one or more network interface cards (NICs) with network connectivity to the corresponding LAN. The PC/workstation 45 or 75 may be a processing system running a virtualized environment.

Figure 1B:
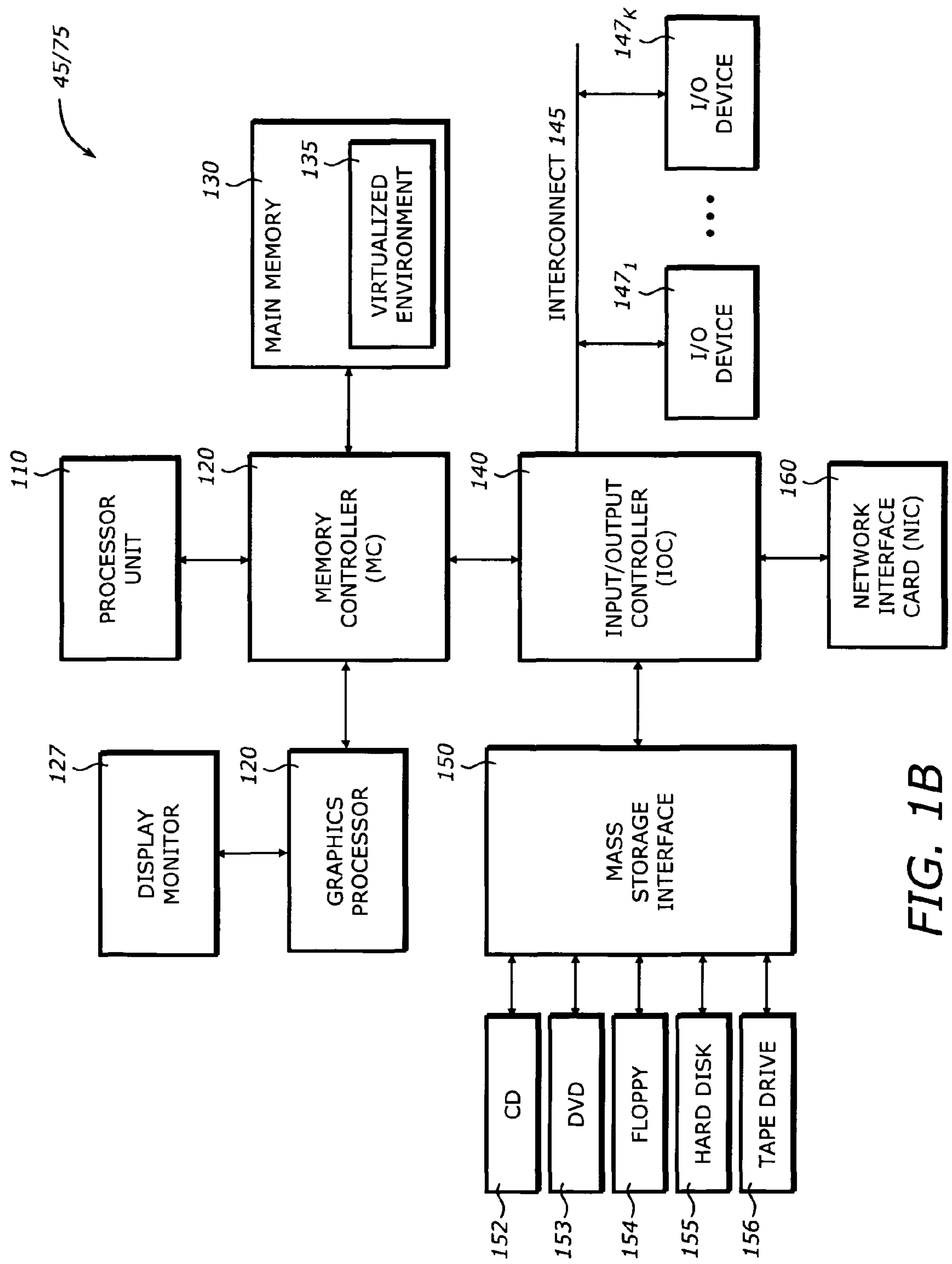
FIG. 1B is a diagram illustrating a processing system according to one embodiment of the invention.

FIG. 1B is a diagram illustrating the processing system 45/75 in which one embodiment of the invention can be practiced. The system 45/75 includes a processor unit 110, a memory controller (MC) 120, a main memory 130, a graphics processor 125, an input/output controller (10C) 140, an interconnect 145, a mass storage interface 150, input/output (I/O devices $\mathbf{147}_1$ to $\mathbf{147}_K$, and a network interface card (NIC) 160. The processing system 45/75 may be a virtualized platform having a number of VMs.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. There may be more than one processor unit 110 on the platform.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices with a bandwidth of 8.5 Gigabyte per second (GB/s). In one embodiment, the memory 130 includes a virtualized environment 135. The virtualized environment 135 may support a virtualized power management unit. The virtualized environment 135 provides the creation of multiple VMs including the power VM running on the platform. The virtualized environment 135 or the virtualized power management unit may be fully or partly implemented by hardware, firmware, or software, or any combination thereof. In addition, the virtualized environment 135 or the virtualized power management unit may be fully or partly located in the memory 130. The virtualized power management unit may be interfaced to a number of interrupting sources such as the I/O devices $\mathbf{147}_1$ to $\mathbf{147}_K$ and the NIC 160, or any other system-level sources such as ACPI, battery alarm, etc.

The graphics processor 125 is any processor that provides graphics functionalities. The graphics processor 125 may also be integrated into the MC 120 to form a Graphics and Memory Controller (GMC). The graphics processor 125 may be a graphics card such as the Graphics Performance Accelerator (AGP) card, interfaced to the MC 120 via a graphics port such as the Accelerated Graphics Port (AGP) or a peripheral component interconnect (PCI) Express interconnect. The graphics processor 125 provides interface to the display monitor 127 such as standard progressive scan monitor, television (TV)-out device, and Transition Minimized Differential Signaling (TMDS) controller. The display monitor 127 may be any display device such as Cathode Ray Tube (CRT) monitor, TV set, Liquid Crystal Display (LCD), Flat Panel, and Digital CRT.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices $\mathbf{147}_1$ to $\mathbf{147}_K$ may include any I/O devices to perform I/O functions. Examples of I/O devices $\mathbf{147}_1$ to $\mathbf{147}_K$ include controller for input devices (e.g., keyboard, mouse, trackball, pointing device), media card (e.g., audio, video, graphic), network card, and any other peripheral controllers. The I/O devices $\mathbf{147}_1$ to $\mathbf{147}_K$ may be virtualized to belong to designated VMs. A VM owns a device or an interrupting source when the device or the source is mapped to the VM resource pool.

The NIC 160 provides network connectivity to the server 40/70. The NIC 160 may generate interrupts as part of the processing of communication transactions. In one embodiment, the NIC 160 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 160 in the processing system. Typically, the NIC 160 supports standard Ethernet minimum and maximum frame sizes (64 to 1518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may be support copper Gigabit Ethernet defined by IEEE 802.3ab or fiber-optic Gigabit Ethernet defined by IEEE 802.3z.

The NIC 160 may also be a host bus adapter (HBA) such as a Small System Small Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

Figure 2:
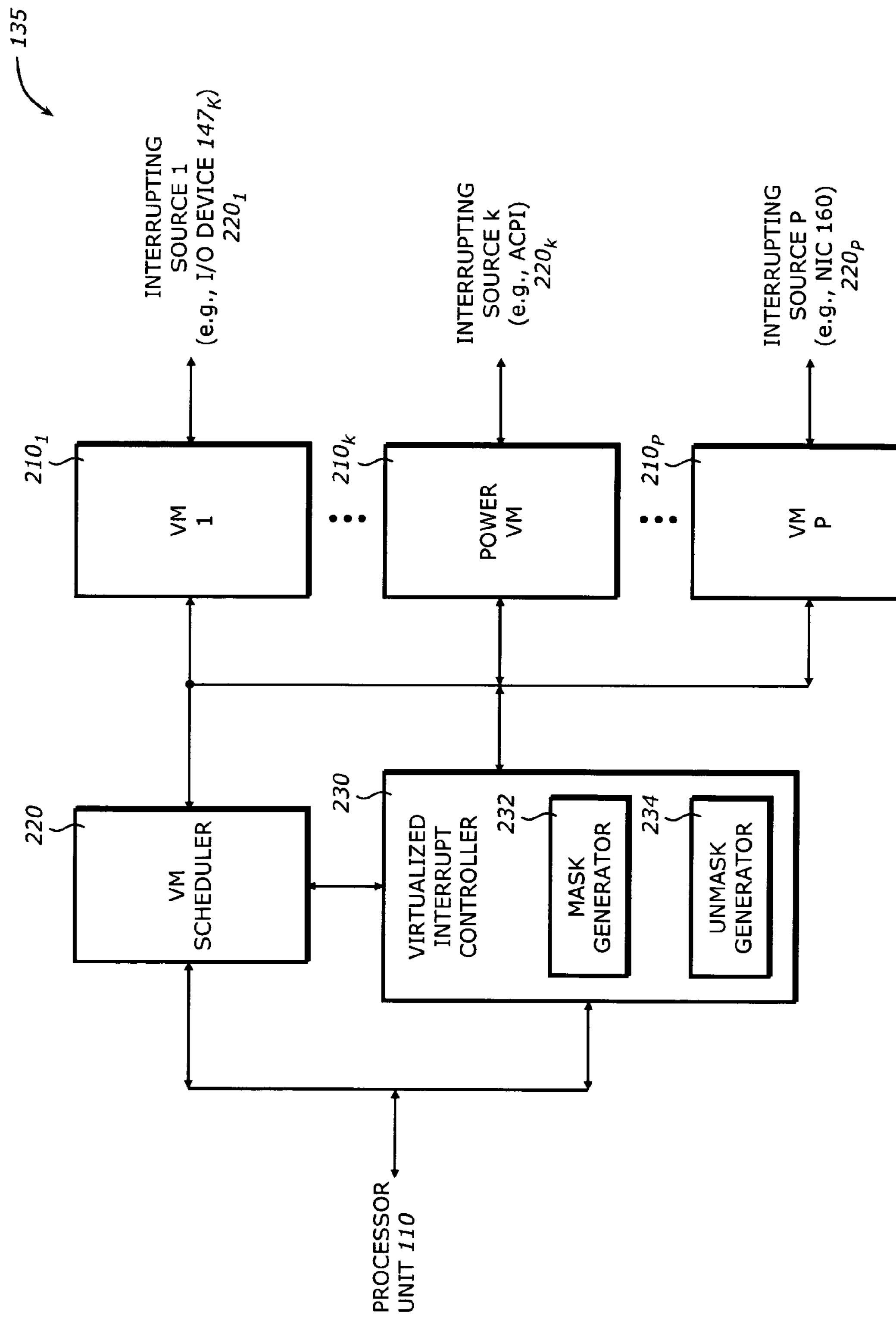
FIG. 2 is a diagram illustrating a virtualized environment according to one embodiment of the invention.

FIG. 2 is a diagram illustrating the virtualized environment 135 shown in FIG. 1B according to one embodiment of the invention. The virtualized environment 135 includes P virtual machines (VMs) $\mathbf{210}_1$ to $\mathbf{210}_P$, a VM scheduler 220, and a virtualized interrupt controller 230. Any of these elements may be implemented by hardware, firmware, or software, or any combination thereof.

The VMs $\mathbf{210}_1$ to $\mathbf{210}_P$ run on the virtualized platform 45/75 having at least the processor unit 110. There may be more than one processor on the platform. The VMs $\mathbf{210}_1$ to $\mathbf{210}_P$ include a power VM. The VMs are controlled by a VM monitor (VMM). Each of the VMs $\mathbf{210}_1$ to $\mathbf{210}_P$ has a number of virtualized devices (e.g., the I/O devices $\mathbf{147}_1$ to $\mathbf{147}_K$ shown in FIG. 1) or sources that are under its control, usage, or ownership. For example, a VM may own a keyboard controller. Another VM may own a mouse controller, etc. The power VM may be a customized VM image loaded on a virtualization product, a module built into the virtualization product, or a functionality as part of the VMM. The virtualization product may be a hardware, firmware, or software product or application. The power VM may be responsible for an interrupting source related to the platform or a designated event. The interrupting source related to the platform may be any platform power management source such as ACPI sources. The designated event may be any special or proprietary event that is specially assigned to the power VM for VM power management.

The VM scheduler 220 schedules the VMs for execution on the virtualized platform 45/75 according a scheduling policy. The VM scheduler 220 may schedule the VMs $\mathbf{210}_1$ to $\mathbf{210}_P$ according to the scheduling policy having a duty cycle profile. A duty cycle profile shows the time periods or time slices during which a VM is allocated or assigned to the processor unit 110. It is in essence a timing diagram that shows the periods during which the VMs $\mathbf{210}_1$ to $\mathbf{210}_P$ are scheduled for execution or resume execution. Typically, a VM is scheduled for execution for a pre-determined time period or slice. When the time period expires, the VM exits so that the next scheduled VM may resume execution. When the scheduled time periods for the VMs are equal, the duty cycle of each VM is approximately (1/P)*100 percent. In one embodiment, the scheduling policy is a round robin policy that provides a time slice for each of the VMs for execution using the processor unit 110. Any other suitable scheduling policy may be employed. For example, the scheduling policy may be a weighted round robin where the time slices allocated for the VMs may be unequal or weighted according to a pre-defined power or performance criteria. The scheduling policy may also be static or dynamic. A static policy is fixed or constant. A dynamic policy varies according to the dynamics of the platform. For example, a VM that has many frequently generated interrupts may be scheduled more often than others.

The virtualized interrupt controller 230 controls masking an interrupt from an interrupting source according to the scheduling policy. Interrupt masking is an operation that masks or disables an interrupt. The operation in essence defers notification of the interrupt to a later time. The virtualized interrupt controller 230 includes an interrupt mask generator 232 and an interrupt unmask generator 234.

The interrupt mask generator 232 masks or disables the interrupt if the associated interrupting source does not belong to a currently scheduled VM. When an interrupt is masked or disabled, its notification to the processor is deferred until the VM that its source belongs to resumes execution. The interrupt unmask generator 234 unmasks or enables the interrupt if the interrupting source belongs to a currently scheduled VM. When an interrupt or enabled, its notification is posed to the processor for immediate service or processing.

Figure 3:
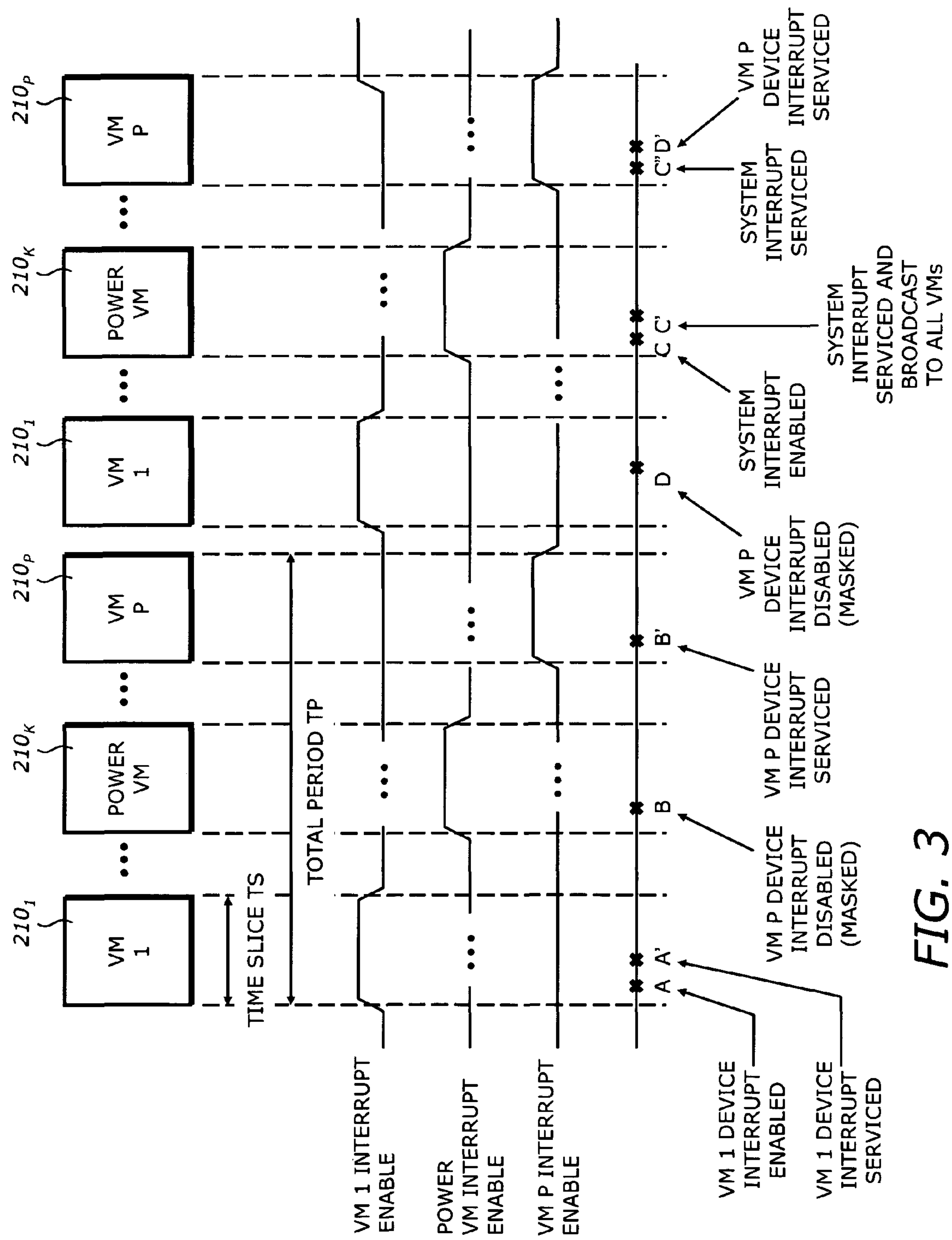
FIG. 3 is a diagram illustrating a scheduling policy according to one embodiment of the invention.

FIG. 3 is a diagram illustrating a scheduling policy according to one embodiment of the invention. This scheduling policy is a round robin policy which assigns time slices to each of the VMs $\mathbf{210}_1$ to $\mathbf{210}_P$ in equal portions and in order. The policy may process all VMs as having the same priority. For illustrative purposes, the VM $\mathbf{210}_k$ is the power VM.

FIG. 3 shows the duty cycle profiles for the VMs $\mathbf{210}_1$ to $\mathbf{210}_P$. The duty cycle D is the ratio, expressed in percentage, between the time slice TS during which a VM is active or scheduled for execution and the total time period P for all VMs. In other words, D=(TS/P)%. For a round robin scheduling policy, the duty cycle profiles for the VM 1 $\mathbf{210}_1$, . . . , the power VM $\mathbf{210}_k$, . . . , and the VM P are shown to have a duty cycle of approximately (1/P)*100 percent.

At time instant A when the VM 1 is scheduled for execution, a VM 1 device interrupt is generated. Since the interrupting source, a VM 1 device, belongs to the currently scheduled VM, it is unmasked or enabled. The virtualized interrupt controller 230 posts a notification of the interrupt to the processor unit 110 at time instants A' so that the interrupt may be serviced immediately.

At time instant B when the power VM is scheduled for execution, a VM P device interrupt is generated. Since the interrupting source, a VM P device, does not belong to the currently scheduled VM, it is masked or disabled. The virtualized interrupt controller 230 defers notification of the interrupt to the processor unit 110 until the VM P is scheduled for execution. This VM P interrupt becomes a pending interrupt.

At time instant B' when the VM P is scheduled for execution, the interrupting sources of all the pending interrupts are examined. In this case, the VM P device interrupt is found to have an interrupting source belonging to the currently scheduled VM. Therefore, it is unmasked or enabled. The virtualized interrupt controller 230 posts a notification of the interrupt to the processor unit 110 so that the interrupt may be serviced immediately.

At time instant D when the VM 1 is scheduled for execution, a VM P device interrupt is generated. Since the interrupting source does not belong to the currently scheduled VM, it is deferred.

At time instant C when the power VM is scheduled for execution, a system interrupt occurs. A system interrupt belongs to the power VM. Therefore, it is unmasked or enabled to be services immediately at time instant C'. In addition, in some configurations, such system-level interrupt may be broadcast to all other VMs so that they may process the interrupt as soon as they resume.

At time instant C" when the VM P is scheduled for execution, the system interrupt occurring at time instant C is serviced. Subsequently, at time instant D', the VM P device interrupt occurring at time instant D is unmasked or enabled to be serviced. Normally, when there are multiple pending interrupts for the same VM, the processing order may be based on a pre-determined priority.

Figure 4:
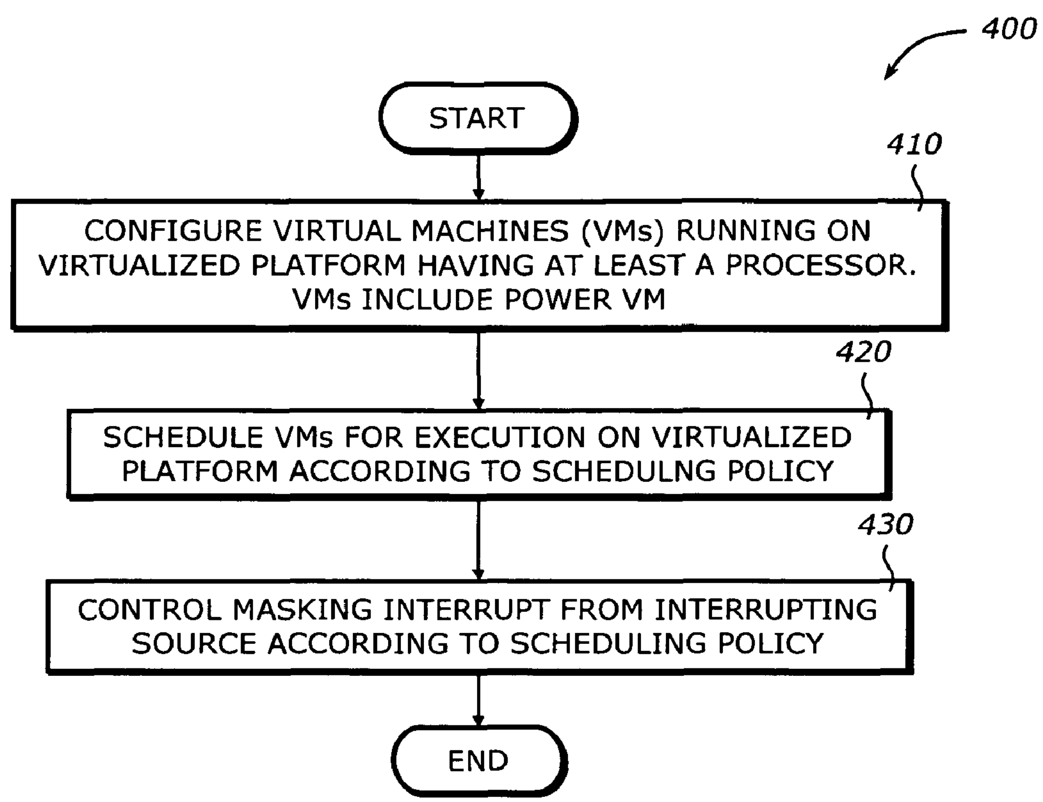
FIG. 4 is a flowchart illustrating a process to process an interrupt using scheduling VMs according to one embodiment of the invention.

FIG. 4 is a flowchart illustrating a process 400 to process an interrupt using scheduling VMs according to one embodiment of the invention.

Upon START, the process 400 configures a plurality of virtual machines (VMs) running on a virtualized platform having at least a processor (Block 410). The VMs include a power VM. Next, the process 400 schedules the VMs for execution on the virtualized platform according to a scheduling policy (Block 420).

Then, the process 400 controls masking an interrupt from an interrupting source according to the scheduling policy (Block 430) and is then terminated.

Figure 5:
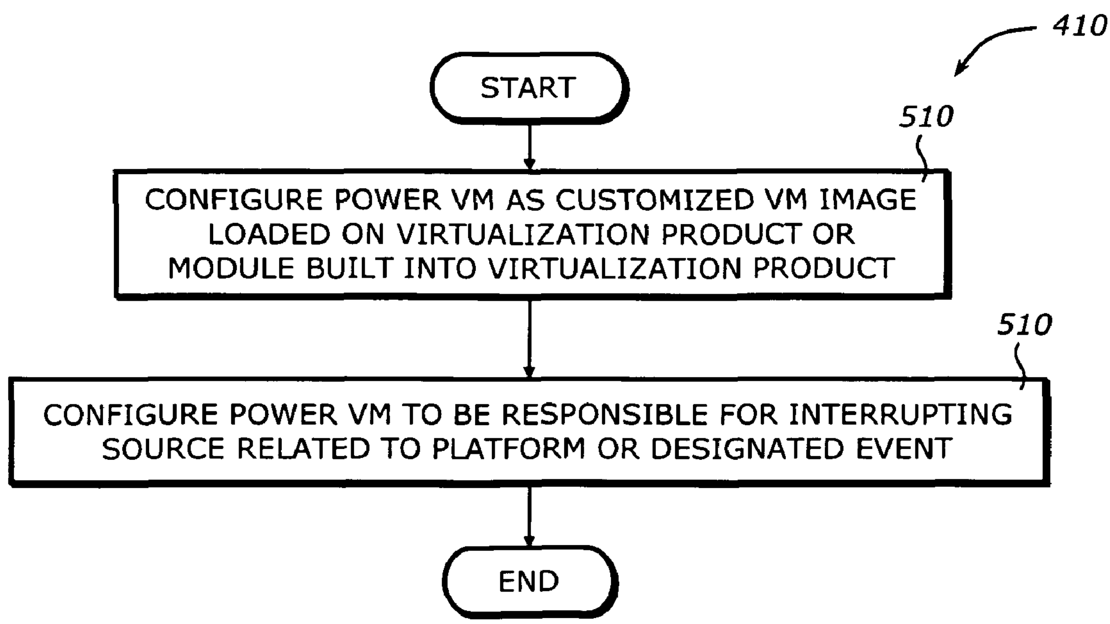
FIG. 5 is a flowchart illustrating a process to configure the VMs according to one embodiment of the invention.

FIG. 5 is a flowchart illustrating the process 410 to configure the VMs according to one embodiment of the invention.

Upon START, the process 410 configures the power VM as a customized VM image loaded on a virtualization product or a module built into the virtualization product (Block 410). The power VM may also be a functionality of the VMM. Next, the process 410 configures the power VM to be responsible for an interrupting source related to the platform or a designated event (Block 520). The process 410 is then terminated.

Figure 6:
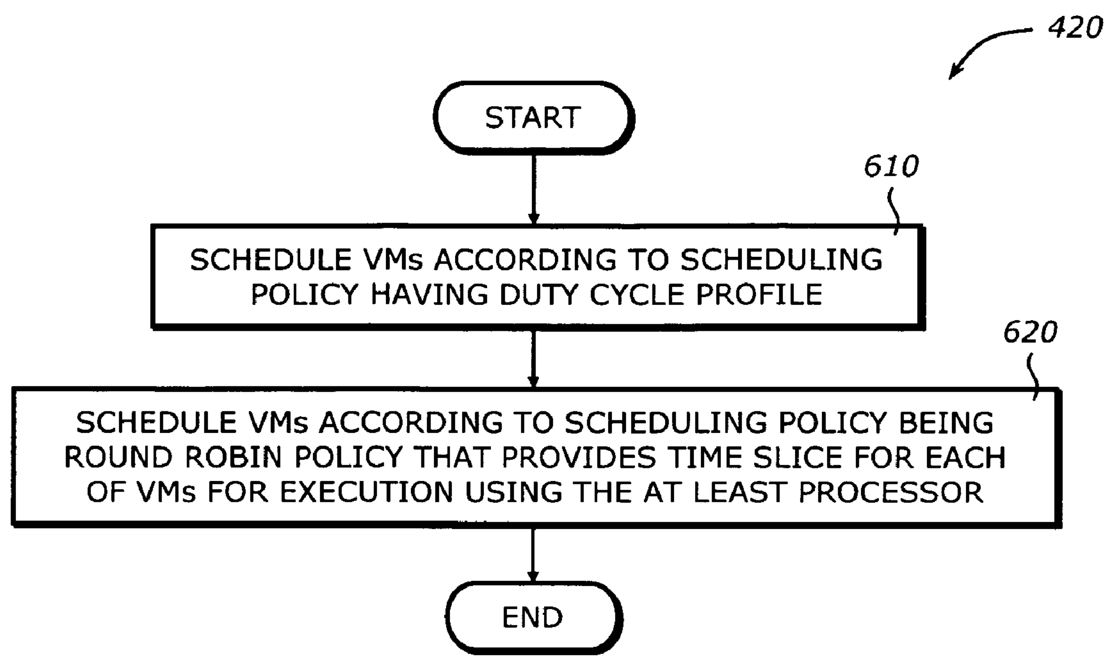
FIG. 6 is a flowchart illustrating a process to schedule the VMs according to one embodiment of the invention.

FIG. 6 is a flowchart illustrating the process 420 to schedule the VMs according to one embodiment of the invention.

Upon START, the process 420 schedules the VMs according to the scheduling policy having a duty cycle profile (Block 610). Next, the process 420 schedules the VMs according to the scheduling policy being a round robin policy that provides a time slice for each of the VMs for execution using the at least processor (Block 620). The process 420 is then terminated.

Figure 7:
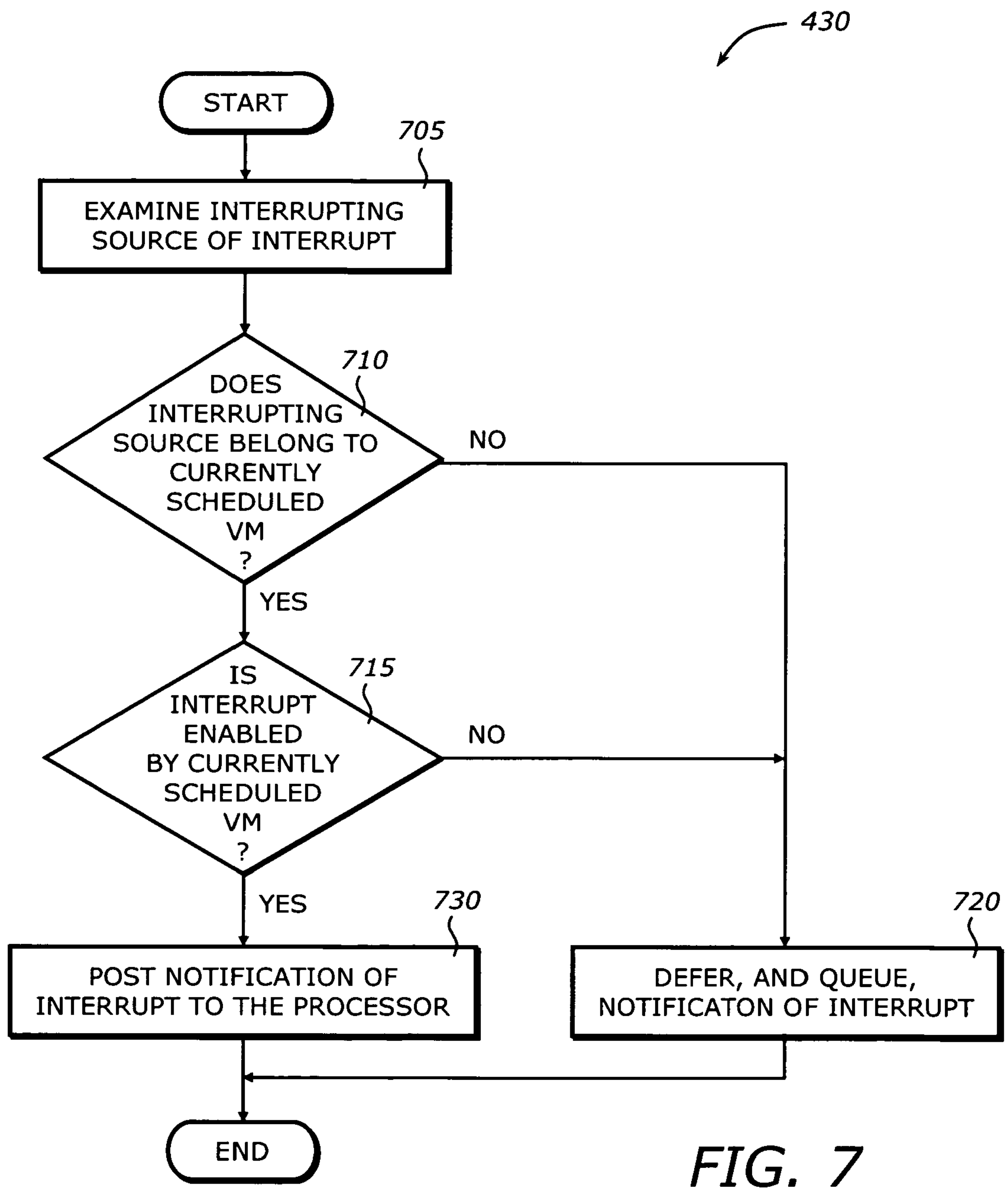
FIG. 7 is a flowchart illustrating a process to control masking interrupt according to one embodiment of the invention.

FIG. 7 is a flowchart illustrating the process 430 to control masking interrupt according to one embodiment of the invention.

Upon START, the process 430 examines the interrupting source of the interrupt (Block 705). Then, the process 430 determines if the interrupting source belongs to the currently scheduled VM (Block 710). If not, the process 430 defers and queues notification of the interrupt (Block 720) and is then terminated. Otherwise, the process 430 determines if the interrupt is enabled or unmasked by the currently scheduled VM (Block 715). If not, the process 430 goes to Block 720. Otherwise, the process 430 posts notification of the interrupt to the processor (Block 730) and is then terminated.

Figure 8:
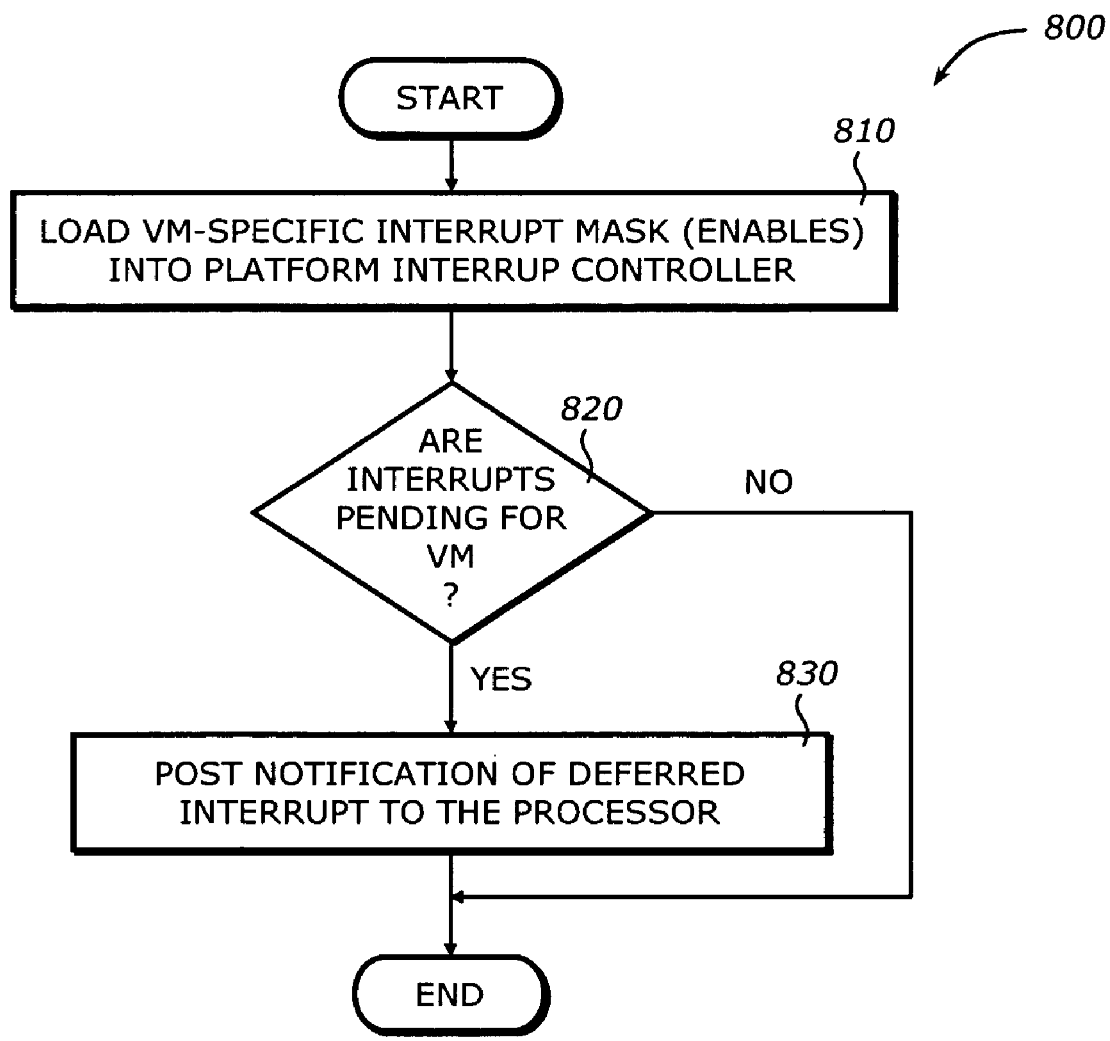
FIG. 8 is a flowchart illustrating a process to unmask a deferred interrupt according to one embodiment of the invention.

FIG. 8 is a flowchart illustrating the process 800 to unmask a deferred interrupt according to one embodiment of the invention. The process 800 may be performed when a VM is scheduled for execution or resumes execution.

Upon START, the process 800 loads the VM-specific interrupt mask or enables into the platform interrupt controller (Block 810). Next, the process 800 determines if there are pending interrupts for this VM (Block 820). If not, the process 800 is terminated. Otherwise, the process 800 posts notification of the interrupt to the processor (Block 830). The process 800 is then terminated.

The process 800 may not be needed if the virtualized interrupt controller 230 posts a deferred interrupt in a queue designated for the associated VM. In other words, the interrupting source is identified at the time the virtualized interrupt controller 230 processes the interrupt. Therefore, when a VM resumes operation, it only needs to retrieve the pending interrupt that has already been posted in its queue and processes this interrupt.

The VM-specific interrupt masks, which is collectively a set of individually enabled/disabled interrupt sources, are dynamic entities. Specifically, within this VM-specific interrupt mask, interrupts may be dynamically enabled and disabled during normal operation of the VM processing interrupts from devices. The VM disabling the "interrupt" source does not 'disown' the interrupt from the VM, disabling merely defers processing of that event until a later time. Thereby, a VM has control over when the VM processes device interrupts it owns. If the VM enables an interrupt which belongs to the VM and is previously "deferred", the deferred interrupt is forwarded to the processor for processing.

Figure 9:
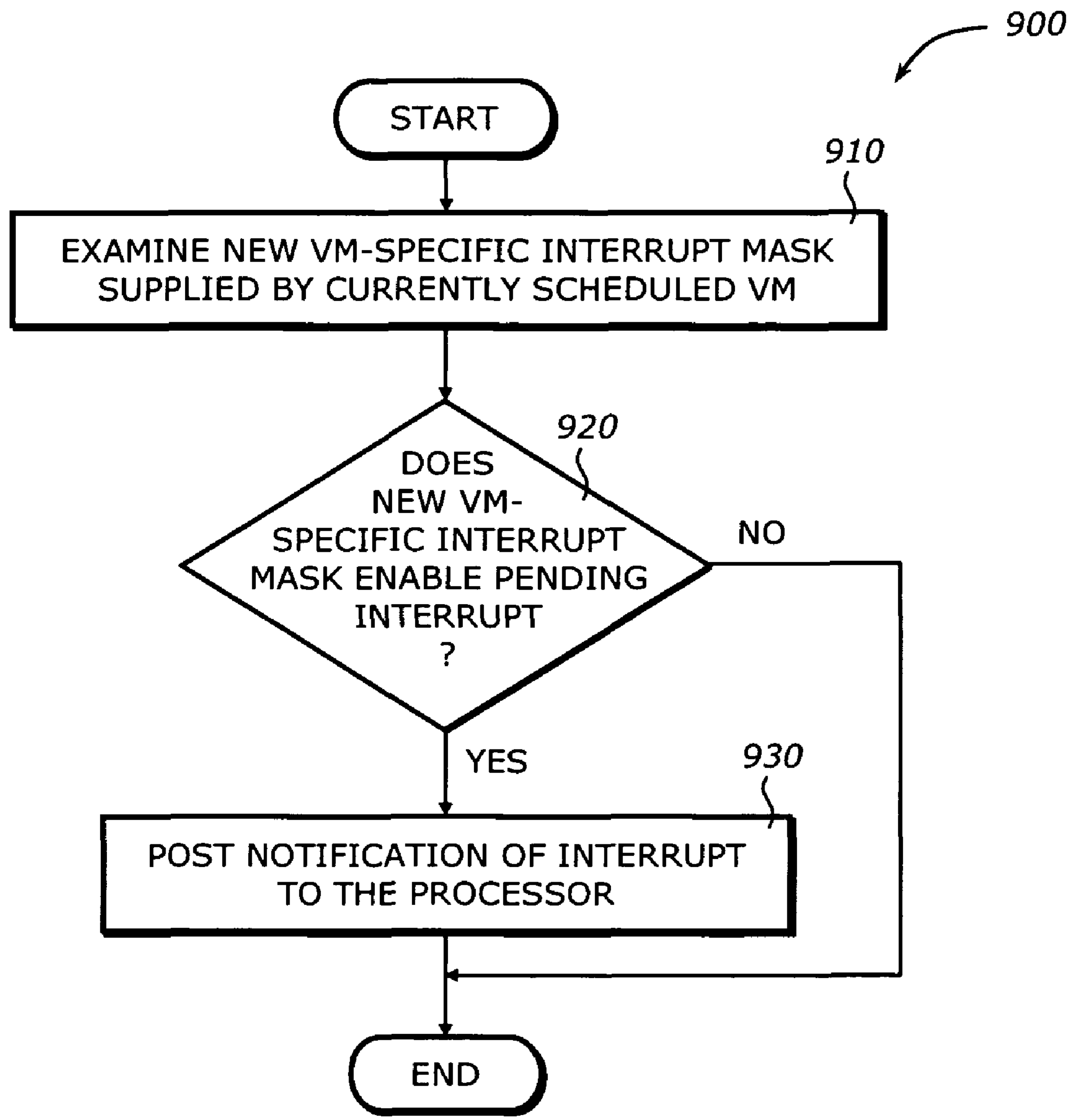
FIG. 9 is a flowchart illustrating a process to post notification of pending interrupt according to one embodiment of the invention.

FIG. 9 is a flowchart illustrating a process 900 to post notification of pending interrupt according to one embodiment of the invention.

Upon START, the process 900 examines the new VM-specific interrupt mask supplied by the currently scheduled VM (Block 910). Then, the process 900 determines if the new VM-specific interrupt mask enables a pending interrupt (Block 920). If not, the process 900 is terminated. Otherwise, the process 900 posts notification of the interrupt to the processor (Block 930) and is then terminated.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:

a processor;

a plurality of virtual machines (VMs) running on a virtualized platform;

a virtual machine (VM) scheduler coupled to the VMs to schedule the VMs for execution on the virtualized platform according a scheduling policy, wherein the scheduling policy is a round robin policy that provides a time slice for each of the VMs for execution using the processor; and a virtualized interrupt controller coupled to the VM scheduler to control masking an interrupt from an interrupting source according to the scheduling policy, wherein the virtualized interrupt controller comprises:

an interrupt mask generator to mask the interrupt if the interrupting source does not belong to a currently scheduled VM, and an interrupt unmask generator to unmask the interrupt if the interrupting source belongs to a currently scheduled VM, wherein the interrupt unmask generator unmasks a deferred interrupt if the interrupting source of the deferred interrupt belongs to a VM currently scheduled in accordance with the time slice associated with the currently scheduled VM.

2. The apparatus of claim 1 wherein the VMs include a power VM, and wherein the power VM is a customized VM image loaded on a virtualization product or a module built into the virtualization product.

3. The apparatus of claim 1 wherein the VMs include a power VM and wherein the power VM is responsible for an interrupting source related to the platform or a designated event.

4. The apparatus of claim 1 wherein the VM scheduler schedules the VMs according to the scheduling policy having a duty cycle profile.

5. The apparatus of claim 1 wherein the interrupt mask generator defers notification of the interrupt.

6. The apparatus of claim 1 wherein the interrupt unmask generator posts notification of the interrupt to the processor.

7. A method comprising:

configuring a plurality of virtual machines (VMs) running on a virtualized platform having at least a processor;

scheduling the VMs for execution on the virtualized platform according to a scheduling policy, wherein the scheduling policy is a round robin policy that provides a time slice for each of the VMs for execution using the processor; and controlling masking an interrupt from an interrupting source according to the scheduling policy, wherein controlling masking comprises:

masking the interrupt if the interrupting source does not belong to a currently scheduled VM, and unmasking the interrupt if the interrupting source belongs to a currently scheduled VM, wherein the unmasking comprises unmasking a deferred interrupt if the interrupting source of the deferred interrupt belongs to a VM currently scheduled in accordance with the time slice associated with the currently scheduled VM.

8. The method of claim 7 wherein the VMs include a power VM and wherein configuring the VMs comprises:

configuring the power VM as a customized VM image loaded on a virtualization product or a module built into the virtualization product.

9. The method of claim 7 wherein the VMs include a power VM and wherein configuring the VMs comprises:

configuring the power VM to be responsible for an interrupting source related to the platform or a designated event.

10. The method of claim 7 wherein scheduling the VMs comprises: scheduling the VMs according to the scheduling policy having a duty cycle profile.

11. The method of claim 7 wherein masking comprises: deferring notification of the interrupt.

12. The method of claim 7 wherein unmasking comprises: posting notification of the interrupt to the processor.

13. A system comprising:

a network interface card (NIC) connected to a network to receive and transmit packets, the NIC supporting a full-duplex Gigabit Ethernet interface; and a virtualized power management unit coupled to the NIC and a plurality of input/output (I/O) devices on a virtualized platform to reduce power consumption, the virtualized power management unit comprising:

a plurality of virtual machines (VMs) running on the virtualized platform having at least a processor, a virtual machine (VM) scheduler coupled to the VMs to schedule the VMs for execution on the virtualized platform according a scheduling policy, wherein the scheduling policy is a round robin policy that provides a time slice for each of the VMs for execution using the processor, and a virtualized interrupt controller coupled to the VM scheduler to control masking an interrupt from an interrupting source according to the scheduling policy, wherein the virtualized interrupt controller comprises:

an interrupt mask generator to mask the interrupt if the interrupting source does not belong to a currently scheduled VM, and an interrupt unmask generator to unmask the interrupt if the interrupting source belongs to a currently scheduled VM, wherein the interrupt unmask generator unmasks a deferred interrupt if the interrupting source of the deferred interrupt belongs to a VM currently scheduled in accordance with the time slice associated with the currently scheduled VM.

14. The apparatus of claim 13 wherein the VMs include a power VM and wherein the power VM is responsible for an interrupting source related to the platform or a designated event.

15. An article of manufacture comprising:

a processor-accessible non-transitory storage medium including instructions that, when executed by a processor, cause the processor to perform operations comprising:

configuring a plurality of virtual machines (VMs) running on a virtualized platform having at least a processor;

scheduling the VMs for execution on the virtualized platform according to a scheduling policy, wherein the scheduling policy is a round robin policy that provides a time slice for each of the VMs for execution using the processor; and controlling masking an interrupt from an interrupting source according to the scheduling policy, wherein controlling masking comprises:

masking the interrupt if the interrupting source does not belong to a currently scheduled VM, and unmasking the interrupt if the interrupting source belongs to a currently scheduled VM, wherein the unmasking comprises unmasking a deferred interrupt if the interrupting source of the deferred interrupt belongs to a VM currently scheduled in accordance with the time slice associated with the currently scheduled VM.

16. The article of manufacture of claim 15 wherein the VMs include a power VM and wherein configuring the VMs comprises:

configuring the power VM to be responsible for an interrupting source related to the platform or a designated event.

17. The article of manufacture of claim 15 wherein masking the interrupt comprises:

deferring notification of the interrupt until the interrupt is unmasked.

18. The article of manufacture of claim 15 wherein unmasking the interrupt comprises:

posting notification of the interrupt to the processor.

* * * * *